(12) United States Patent  (10) Patent No.: US 8,411,122 B2
Sakita et al.  (45) Date of Patent: Apr. 2, 2013

(54) EXPOSURE DEVICE AND IMAGE FORMING APPARATUS

(75) Inventors: Tomoaki Sakita, Kanagawa (JP);
Fumiya Hisa, Kanagawa (JP);
Toshiharu Orui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 141 days.

(21) Appl. No.: 13/114,653

(22) Filed: May 24, 2011

(65) Prior Publication Data

US 2012/0105563 A1 May 3, 2012

(30) Foreign Application Priority Data

Nov. 2, 2010 (JP) ................................ 2010-246454

(51) Int. Cl.
*B41J 2/435* (2006.01)
(52) U.S. Cl. ........................................................ 347/236
(58) Field of Classification Search .................. None
See application file for complete search history.

(56) References Cited

U.S. PATENT DOCUMENTS 7,992,159 B2 * 8/2011 Kamel et al. .................. 720/685

FOREIGN PATENT DOCUMENTS

JP 2008-304363 A 12/2008
JP 2008304363 A * 12/2008

* cited by examiner

*Primary Examiner* — Geoffrey Mruk
*Assistant Examiner* — Bradley Thies
(74) *Attorney, Agent, or Firm* — Sughrue Mion, PLLC

(57) ABSTRACT

An exposure device includes light emitting elements, a driving circuit, an image-signal connector, a power connector, and an adjustment-control-signal connector. The light emitting elements emit light which an exposure target member is exposed to. The driving circuit performs one of first and second drive operations. The image-signal connector has terminals connected to core wires of an image-signal cable, and relays, to the driving circuit, image signals transmitted through the image-signal cable. In the image-signal cable, the core wires are arranged at a first pitch. The power connector has terminals arranged at a pitch wider than the first pitch, and relays, to the driving circuit, power transmitted through power cables. The adjustment-control-signal connector has terminals arranged at a pitch wider than the first pitch, and relays, to the driving circuit, light-amount adjustment control signals transmitted through adjustment-control-signal cables.

5 Claims, 10 Drawing Sheets

EXPOSURE DEVICE AND IMAGE FORMING APPARATUS

CROSS-REFERENCE TO RELATED APPLICATIONS

This application is based on and claims priority under 35 USC 119 from Japanese Patent Application No. 2010-246454 filed Nov. 2, 2010.

BACKGROUND (i) Technical Field

The present invention relates to an exposure device and an image forming apparatus.

(ii) Related Art

Among image forming apparatuses that form images, for example, there is an image apparatus including an exposure device that forms electrostatic latent images by exposing a photoconductor to light. The exposure device and the body of the image forming apparatus are connected to each other via wires.

SUMMARY

According to an aspect of the invention, there is provided an exposure device including multiple light emitting elements, a driving circuit, an image-signal connector, a power connector, and an adjustment-control-signal connector. The multiple light emitting elements emit light which an exposure target member is exposed to. The driving circuit performs at least one of a first drive operation and a second drive operation. The first drive operation is an operation of receiving multiple supplied image signals corresponding to the multiple light emitting elements and of individually driving, for use in exposure to light, the multiple light emitting elements in accordance with the multiple image signals. The second drive operation is an operation of receiving supplied light-amount adjustment control signals used to control amounts of light and of individually driving, for use in adjustment of the amounts of light, the multiple light emitting elements in accordance with the light-amount adjustment control signals. The image-signal connector has multiple terminals connected to multiple core wires of an image-signal cable, and relays the multiple image signals, which have been transmitted through the image-signal cable, to the driving circuit. In the image-signal cable, the multiple core wires through which the multiple image signals are transmitted are arranged at a first pitch. The image-signal cable is formed so as to have a sheet shape. The power connector has multiple terminals which are arranged at a pitch substantially wider than the first pitch, and relays, to the driving circuit, power which has been transmitted through multiple power cables. Each of the multiple terminals of the power connector is connected to a corresponding one of core wires of the multiple power cables through which power is transmitted. The adjustment-control-signal connector has multiple terminals which are arranged at a pitch substantially wider than the first pitch, and relays, to the driving circuit, the light-amount adjustment control signals which have been transmitted through multiple adjustment-control-signal cables. Each of the multiple terminals of the adjustment-control-signal connector is connected to a corresponding one of core wires of the multiple adjustment-control-signal cables through which the light-amount adjustment control signals are transmitted.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described.

Figure 1:
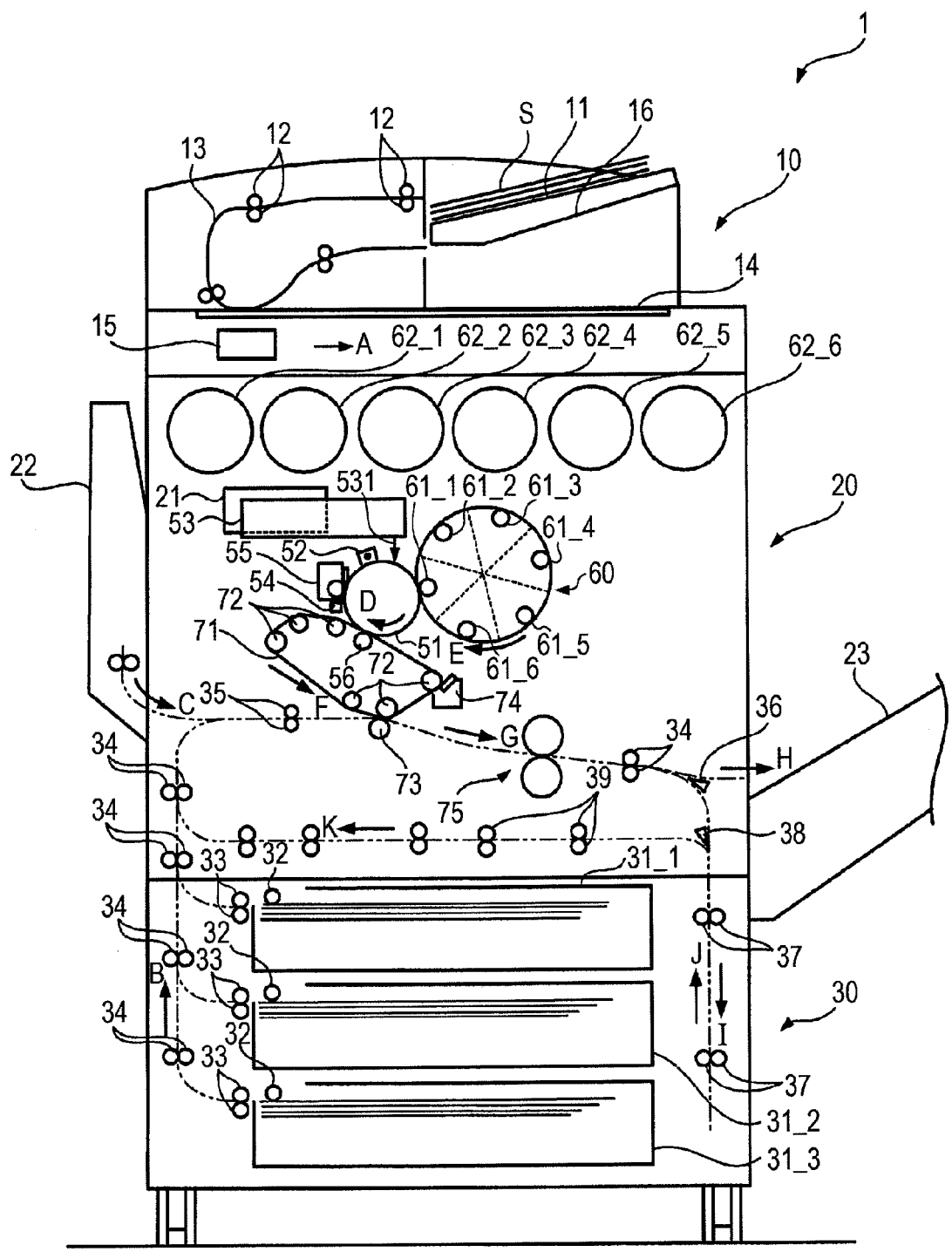
FIG. 1 is a diagram schematically illustrating a configuration of an image forming apparatus according to an exemplary embodiment of the present invention.

FIG. 1 is a diagram schematically illustrating a configuration of an image forming apparatus according to an exemplary embodiment of the present invention. An exposure device 53 is incorporated in an image forming apparatus 1 illustrated in FIG. 1. The exposure device 53 corresponds to an exposure device according to an exemplary embodiment of the present invention.

The image forming apparatus 1 includes a document reading section 10, an image forming section 20, and a paper storage section 30.

The document reading section 10 includes a document feeder tray 11 on which documents S are arranged in a stack. The documents S arranged on the document feeder tray 11 are fed out on a one-by-one basis, and transported along a transport path 13 by transport rollers 12. Characters and images recorded on the transported documents S are read by a document reading optical system 15 that is disposed below a document reading board 14 made of clear glass, and the documents S are output onto a document output tray 16.

Furthermore, the document reading section 10 has a hinge extending in the right-left direction on the rear side thereof. The document feeder tray 11 and the document output tray 16 can be lifted up as one piece with the hinge serving as a center of rotation. The document reading board 14 is provided below the document feeder tray 11 and the document output tray 16 that are lifted up. In the document reading section 10, instead of arranging documents on the document feeder tray 11, only one document may be disposed on the document reading board 14 so that the face of the document is oriented downward. The document reading optical system 15 may move in the direction of arrow A, whereby characters and images may be read from the document disposed on the document reading board 14.

Image signals obtained by the document reading optical system 15 are input to a processing and control circuit 21. The processing and control circuit 21 forms an image on the basis of the input image signals as described below. Furthermore, the processing and control circuit 21 is in control of operations of the individual sections of the image forming apparatus 1.

Furthermore, in the paper storage section 30 provided at the lower portion of the image forming apparatus 1, three paper feeder trays 31_1 to 31_3 are accommodated. In the paper feeder trays 31_1 to 31_3, for example, sheets of paper P having sizes that are different on a paper-feeder-tray-by-paper-feeder-tray basis are stored in stacks. Each of the paper feeder trays 31_1 to 31_3 is configured so that the paper feeder tray can be pulled out in order to supply the sheets of paper P.

The sheets of paper P having a size that matches with, for example, the size of a document are stored in a paper feeder tray (here, supposing that the paper feeder tray 31_3 is the paper feeder tray) among the three paper feeder trays 31_1 to 31_3. The sheets of paper P are fed out by a corresponding pickup roller 32 from the paper feeder tray 31_3, and separated from each other by corresponding separating rollers 33. One of the sheets of paper P is transported by transport rollers 34 in the direction of arrow B that is an upward direction. Timing at which the sheet of paper P is transported downstream of standby rollers 35 is adjusted by the standby rollers 35, and the sheet of paper P is further transported. Transport of the sheet of paper P downstream of the standby rollers 35 will be described below.

Furthermore, the image forming section 20 includes a manual paper feeder tray 22. The manual paper feeder tray 22 is a folding tray that opens by pivoting about a lower end portion thereof. The manual paper feeder tray 22 may be made to open, and sheets of paper may be disposed on the manual paper feeder tray 22. The sheets of paper disposed on the manual paper feeder tray 22 may be fed out in the direction of arrow C.

A photoconductor 51 that rotates in the direction of arrow D is included in a central portion of the image forming section 20. A charging device 52, a developing device 60, a static charge eliminator 54, and a cleaner 55 are arranged around the photoconductor 51. Furthermore, the exposure device 53 is arranged above the photoconductor 51. Moreover, a transfer device 56 is disposed at a certain position so that an intermediate transfer belt 71, which is described below, is sandwiched between the transfer device 56 and the photoconductor 51.

The photoconductor 51 has a cylindrical shape. Charge is held on the photoconductor 51 by charging, and is released from the photoconductor 51 by exposure to light, whereby electrostatic latent images are formed on the surface of the photoconductor 51.

The charging device 52 charges the surface of the photoconductor 51 so that the surface has a certain charging potential.

Furthermore, the image signals are input from the processing and control circuit 21 to the exposure device 53. The exposure device 53 outputs light beams 531 that are modulated in accordance with the input image signals. A portion of the surface of the photoconductor 51 that rotates in the direction of arrow D is charged by the charging device 52. The charged portion of the surface of the photoconductor 51 is repeatedly scanned using the light beams 531 in a direction of the rotation axis of the photoconductor 51 (a direction perpendicular to the page in FIG. 1), thereby forming electrostatic latent images on the surface of the photoconductor 51. Furthermore, after electrostatic latent images are formed on the surface of the photoconductor 51 by scanning the photoconductor 51 with the light beams 531, development is performed by the developing device 60, whereby toner images are formed on the surface of the photoconductor 51. Here, the developing device 60 includes six developing units 61_1 to 61_6. The developing device 60 rotates in the direction of arrow E, whereby a developing unit (the developing unit 61_1 in a state illustrated in FIG. 1) among the six developing units 61_1 to 61_6 is moved to a position so as to face the photoconductor 51. A corresponding one of the electrostatic latent images formed on the photoconductor 51 is developed by the developing unit (here, supposing that the developing unit 61_1 is the developing unit) facing the photoconductor 51, whereby a toner image is formed.

Toners of yellow (Y), magenta (M), cyan (C), black (K) and toners of two spot colors that are determined in accordance with a user application are stored on a developing-unit-by-developing-unit basis in the six developing units 61_1 to 61_6 provided in the developing device 60. In a case of developing an electrostatic latent image formed on the photoconductor 51, a developing unit that stores toner of a color to be used this time is rotated to a position so as to face the photoconductor 51, and development is performed by the developing unit, which faces the photoconductor 51, using the toner of the color stored in the developing unit. For example, toner, such as transparent toner used for image glazing or toner whose color has been adjusted so as to be a color frequently used by the user, is used for the spot colors determined in accordance with a user application.

Six toner tanks 62_1 to 62_6 in which toners of the colors that are same as the colors of the toners used in the six developing units 61_1 to 61_6, respectively, are stored are provided above the developing device 60. When the toners stored in the developing units 61_1 to 61_6 are reduced, toners are supplied from the toner tanks 62_1 to 62_6, respectively, in which the toners of the corresponding colors are stored, to the developing units 61_1 to 61_6.

The toner images, which have been formed on the photoconductor 51 by development with the developing units, are transferred onto the intermediate transfer belt 71 by an action of the transfer device 56.

After transfer is performed by the transfer device 56, the photoconductor 51 is subjected to elimination of charge by the static charge eliminator 54. Furthermore, the residual toner remaining on the photoconductor 51 after transfer is performed by the transfer device 56 is removed by the cleaner 55.

The intermediate transfer belt 71 is an endless belt that is stretched around multiple rollers 72, and that rotates in the direction of arrow F. In the vicinity of the intermediate transfer belt 71, a transfer device 73 is disposed at a position at which a transfer path of the sheet of paper P is sandwiched between the transfer device 73 and one of the rollers 72. A cleaner 74 that removes the residual toner remaining on the intermediate transfer belt 71 after transfer is performed by the transfer device 73 is disposed at a position that is located further downstream from the transfer device 73 on the downstream side of the rotation direction of the intermediate transfer belt 71. A configuration is provided, in which the transfer device 73 and the cleaner 74 are separated from the intermediate transfer belt 71 so as to be able to come into contact with the intermediate transfer belt 71. In a case of forming images having multiple colors, the transfer device 73 and the cleaner 74 are separated from the intermediate transfer belt 71. A process of forming a toner image using toner of one color on the photoconductor 51 and of transferring the toner image onto the intermediate transfer belt 71 is repeated for the multiple developing units (toners of the multiple colors) while the developing device 60 is being rotated, thereby transferring multiple toner images, which have been formed using the toners of the multiple colors, onto the intermediate transfer belt 71 so as to sequentially overlap each other.

After that, the transfer device 73 is brought into contact with the transfer device 73. The sheet of paper P is fed from the standby rollers 35 so as to also reach a transfer position, at which at which the transfer device 73 is disposed, at a time when the overlapping toner images having the multiple colors reach the transfer position. At the transfer position, the toner images having the multiple colors, which have been transferred onto the intermediate transfer belt 71, are transferred onto the sheet of paper P by an action of the transfer device 73. The sheet of paper P onto which the toner images have been transferred is further transported in the direction of arrow G, and is heated and pressurized by a fixing unit 75, whereby an image constituted by the fixed toner images is formed on the sheet of paper P. The sheet of paper P that has passed through the fixing unit 75 is further transported in the direction of arrow H, and output onto a paper output tray 23.

Furthermore, the cleaner 74 also moves into contact with the cleaner 74. Accordingly, the residual toner remaining on the intermediate transfer belt 71 after transfer is performed by the transfer device 73 is removed from the intermediate transfer belt 71 by the cleaner 74.

Furthermore, the image forming apparatus 1 is an apparatus capable of forming images on both sides of the sheet of paper P. In a case of forming images on both sides of the sheet of paper P, an image is formed only on a first side of the sheet of paper P as described above. Using a guiding member 36 that has been switched, the sheet of paper P is transported by transport rollers 37 in the direction of arrow I, instead of being output onto the paper output tray 23. After that, the transport direction of the sheet of paper P is reversed. Using another guiding member 38, the sheet of paper P is transported by transport rollers 39 in the direction of arrow K, and reaches the standby rollers 35.

After that, in a manner similar to the above-described manner, an image is formed on a second side of the sheet of paper P. In this manner, the sheet of paper P having images formed on both sides thereof is output onto the paper output tray 23.

Figure 2:
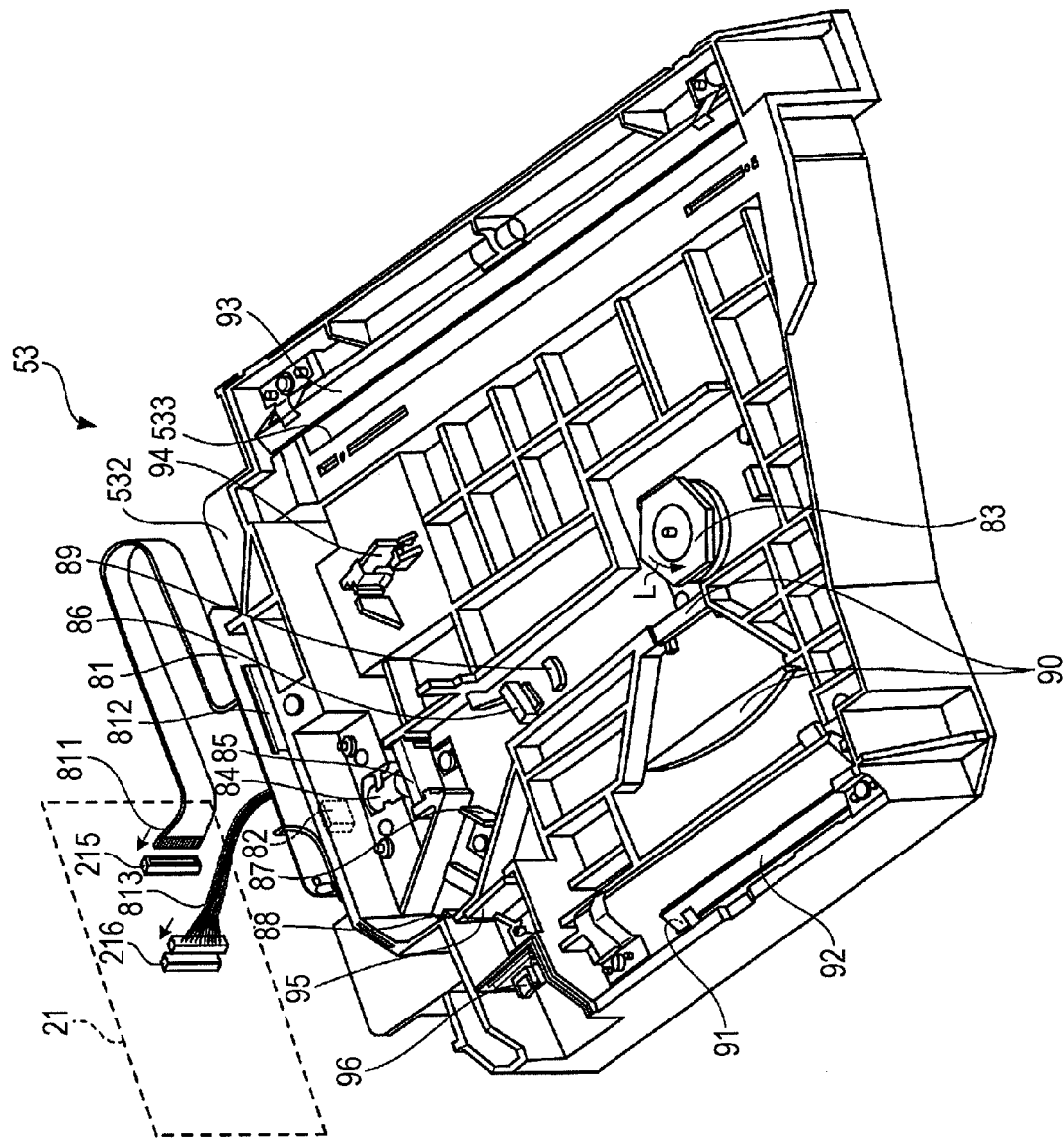
FIG. 2 is a perspective view of an exposure device.

FIG. 2 is a perspective view of the exposure device.

In FIG. 2, the inside of the exposure device is illustrated when a lid of the exposure device is removed.

A circuit board 81 is fixed on a housing 532 of the exposure device 53. A laser diode 82 that is of a vertical cavity-surface emitting laser type is mounted on the circuit board 81. An image-signal cable 811 and power/adjustment-control-signal cables 813 are connected to the circuit board 81. Further, a driving circuit 812 is also mounted on the circuit board 81. The laser diode 82 mounted on the circuit board 81 is a type of laser diode that emits multiple light beams. The exposure device 53 is configured to simultaneously scan the surface of the photoconductor 51, which is illustrated in FIG. 1, using the multiple light beams.

One of two ends of each of the image-signal cable 811 and the power/adjustment-control-signal cables 813 is connected to a corresponding one of connectors 215 and 216 (see FIG. 2) of the processing and control circuit 21 that is fixed in the body of the image forming section 20. The other end of each of the image-signal cable 811 and the power/adjustment-control-signal cables 813 is connected to the circuit board 81. The image-signal cable 811 and the power/adjustment-control-signal cables 813 transmit image signals, power, and various types of control signals from the processing and control circuit 21 to the circuit board 81. The image signals that have been transmitted to the circuit board 81 through the image-signal cable 811 are processed by the driving circuit 812. The image signals are converted into driving signals for controlling, for use in exposure to light, light beams that are to be emitted from the laser diode 82. The driving signals are transmitted to the laser diode 82. The laser diode 82 emits multiple light beams in accordance with the transmitted driving signals. Furthermore, power transmitted through the power/adjustment-control-signal cables 813 is used for an operation of the circuit board 81 and for driving of the laser diode 82. Light-amount adjustment control signals transmitted through the power/adjustment-control-signal cables 813 are used for driving of the laser diode 82 with the driving circuit 812 for use in adjustment of the amounts of light. The image-signal cable 811 and the power/adjustment-control-signal cables 813 are arranged along a path along which the image-signal cable 811 and the power/adjustment-control-signal cables 813 extend from the circuit board 81 in certain directions so as to be separated from each other, and along which both the image-signal cable 811 and the power/adjustment-control-signal cables 813 finally reach the processing and control circuit 21. Accordingly, crosstalk caused by signals between the image-signal cable 811 and the power/adjustment-control-signal cables 813 is lower than, for example, that in a case in which both the image-signal cable 811 and the power/adjustment-control-signal cables 813 are arranged so as to extend side by side. The details about a configuration of each of the image-signal cable 811 and the power/adjustment-control-signal cables 813 and about signals associated therewith are described below.

An optical system including a rotating polygon mirror 83 and multiple other optical members is disposed in the housing 532 of the exposure device 53.

Figure 3:
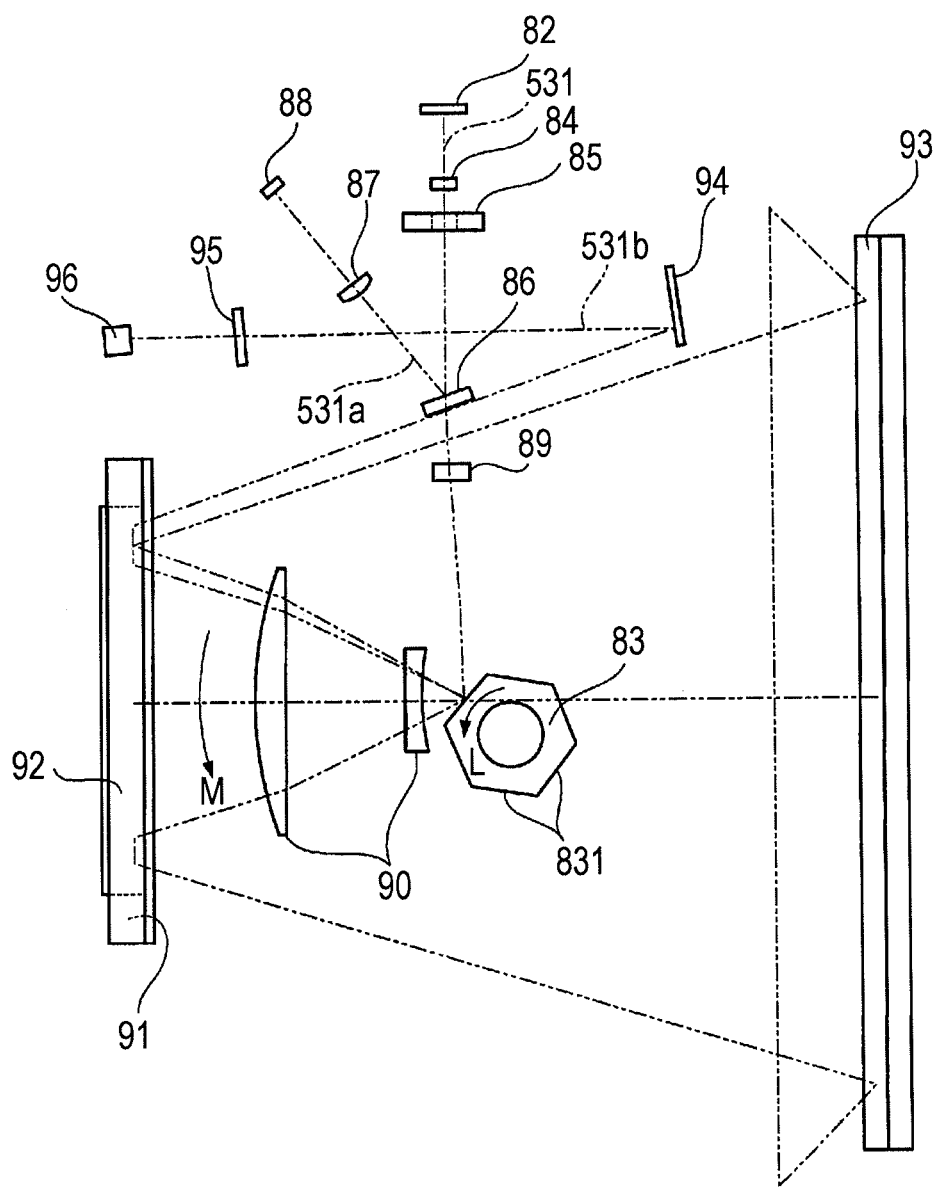
FIG. 3 is a plan view of an optical system that is disposed in a housing of the exposure device.
Figure 4:
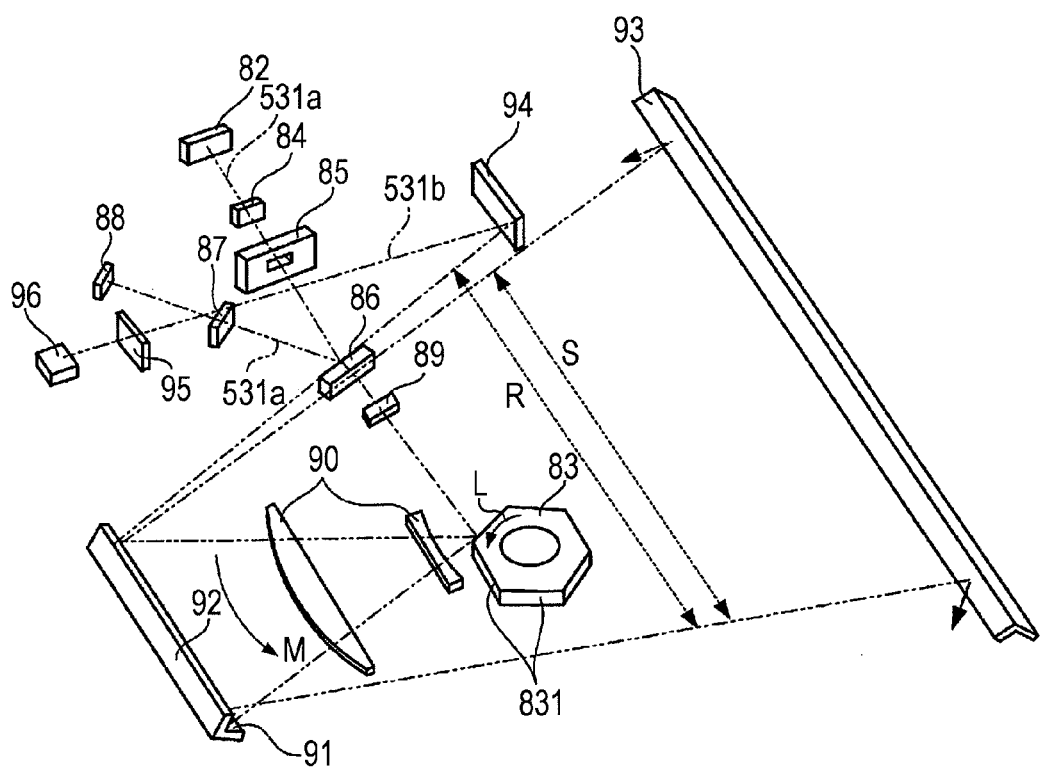
FIG. 4 is a perspective view of the optical system disposed in the housing of the exposure device.

FIGS. 3 and 4 are a plan view and a perspective view, respectively, of the optical system disposed in the housing of the exposure device.

The multiple light beams 531 emitted from the laser diode 82 pass through a collimating lens 84 and an aperture 85, and reach a half mirror 86, thereby striking the half mirror 86 as incident beams. The half mirror 86 reflects some of the incident beams, thereby obtaining reflected beams 531a. The reflected beams 531a are input via a condenser lens 87 to an optical sensor 88 used for detection of the amounts of light. Light-reception signals detected by the optical sensor 88 are transmitted to the circuit board 81 illustrated in FIG. 2. The amounts of light beams to be emitted from the laser diode 82 are adjusted on the basis of the light-reception signals by the driving circuit 812 mounted on the circuit board 81.

Further, the light beams that have passed through the half mirror 86 reach the rotating polygon mirror 83 via a cylindrical lens 89, thereby striking the rotating polygon mirror 83 as incident beams. A peripheral surface 831 of the rotating polygon mirror 83 is a reflecting mirror. The rotating polygon mirror 83 reflects the incident beams in a direction that is determined in accordance with the angle of rotation, thereby obtaining reflected beams. The rotating polygon mirror 83 rotates in the direction of arrow L. Accordingly, the reflected beams are repeatedly polarized in the direction of arrow M.

The light beams that have been reflected by the rotating polygon mirror 83 pass through an fθ lens 90 are reflected by a cylindrical mirror 91 in an upward direction, and are reflected by a plane mirror 92 in a certain direction so as to turn back along the light path of the light beams. Light beams reflected by the mirror 92 pass above the fθ lens 90 and the rotating polygon mirror 83, and are reflected by a cylindrical mirror 93 in a downward direction. The light beams pass through an opening 533 (see FIG. 2) that is provided in the housing 532, and are output from the housing 532 in a downward direction. The photoconductor 51 is scanned using the light beams 531, which have been output from the housing 532 of the exposure device 53, in a direction of the rotation axis of the photoconductor 51 as illustrated in FIG. 1, thereby forming electrostatic latent images on the photoconductor 51.

Furthermore, as illustrated in FIG. 4, a reflection mirror 94 is disposed at a position that is located in a polarization range R in which the light beams are polarized by the rotating polygon mirror 83 and that is located outside a scan region S which is utilized to scan the photoconductor 51. The light beams reflected by the mirror 92 are reflected by the reflection mirror 94 at one scanning-start time. Reflected beams 531b reflected by the reflection mirror 94 enter an optical sensor 96, which is used to detect times, via a condenser lens 95.

The optical sensor 96 is a sensor that detects each scanning-start time in order to adjust timing at which the light beams are modulated. Light-reception signals are obtained by the optical sensor 96, and transmitted to the processing and control circuit 21 illustrated in FIG. 1. Image signals that have been subjected to timing adjustment based on the light-reception signals are generated by the processing and control circuit 21, and transmitted to the circuit board 81. In this manner, the light beams 531 are emitted from the laser diode 82 in a state in which the amounts of the light beams 531 have been adjusted on the basis of the light-reception signals obtained by the optical sensor 88, and in which the light beams 531 have been modulated in accordance with modulation signals that have been subjected to timing adjustment based on the light-reception signals obtained by the optical sensor 96.

Figure 5:
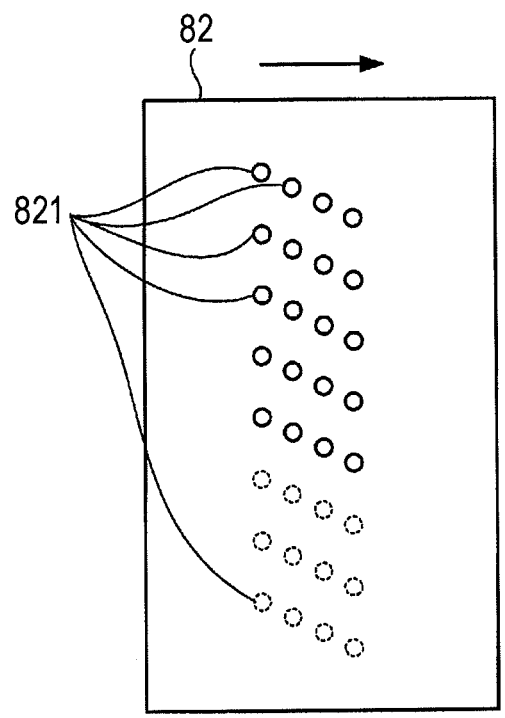
FIG. 5 is a layout schematically illustrating the arrangement of light-emitting elements in a laser diode.

FIG. 5 is a layout schematically illustrating the arrangement of light-emitting elements in the laser diode.

The laser diode 82 is a vertical cavity-surface emitting laser (VCSEL) array in which thirty-two VCSEL-type light-emitting elements 821 that emit light beams in a direction intersecting a face of the board are two-dimensionally arranged. The laser diode 82 can emit thirty-two light beams. Note that, in the present exemplary embodiment, among the thirty-two light-emitting elements 821, twelve light-emitting elements that are arranged on the bottom side of FIG. 5 are not used. Twenty light-emitting elements 821 illustrated on the top side are caused to emit light beams. The optical axes of the lenses and mirrors are adjusted so as to be positioned at a center of a range over which the light-emitting elements 821 used for emission of light are distributed. However, the range of distribution of the light-emitting elements 821 is reduced by limiting the number of light-emitting elements 821 that are used. Light emitted from the light-emitting elements 821 that are distant from the center of the range of distribution of the light-emitting elements 821 passes through the lenses and mirrors, so that the light flux expands. The degree of expansion of the light flux is smaller than, for example, the degree of expansion of a light flux in a case in which thirty-two light-emitting elements distributed over a wide range are used.

Circuit Board of Exposure Device

Figure 6:
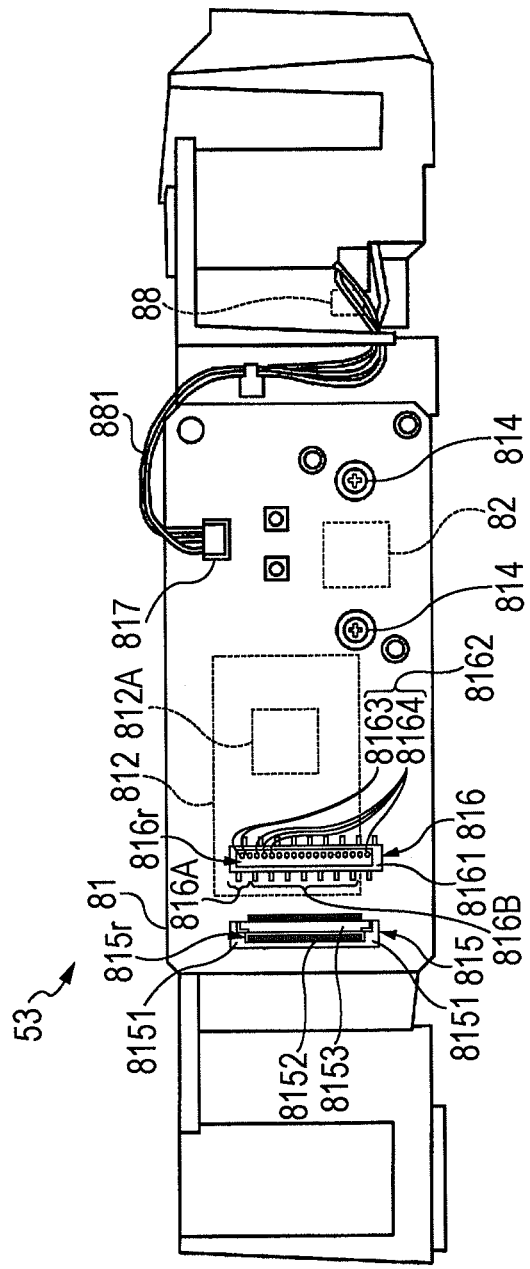
FIG. 6 is a rear view of the exposure device illustrated in FIG. 2, when viewed from a side on which a circuit board is disposed.

FIG. 6 is a rear view of the exposure device illustrated in FIG. 2, when viewed from a side on which the circuit board is disposed. In FIG. 6, the circuit board 81 in a state in which the image-signal cable 811 and the power/adjustment-control-signal cables 813 are removed.

The circuit board 81 is fixed by screws 814 on the housing 532. In FIG. 6, one of two faces of the circuit board 81 is illustrated. An image-signal connector 815 and a power/adjustment-control-signal connector 816, which the image-signal cable 811 and the power/adjustment-control-signal cables 813 (see FIG. 2) are to be connected to, respectively, are mounted on this face of the circuit board 81. Furthermore, a light-amount-sensor-signal connector 817 is mounted. Light-amount-sensor-signal cables 881 through which signals supplied from the optical sensor 88 used for detection of the amounts of light are transmitted are connected to the light-amount-sensor-signal connector 817. Moreover, the laser diode 82 is mounted on the other face of the circuit board 81. Furthermore, the driving circuit 812 is provided. The driving circuit 812 is configured so as to include a semiconductor integrated circuit 812A, which is mounted on the other face, and electronic components, which are mounted around the semiconductor integrated circuit 812A and which are not illustrated. Note that, in FIG. 6, illustration of a conductor pattern that the circuit board 81 has is omitted.

Image-Signal Cable

Here, the image-signal cable 811 and the power/adjustment-control-signal cables 813, which are to be connected to the image-signal connector 815 and the power/adjustment-control-signal connector 816 to, respectively, will be described.

Figure 7:
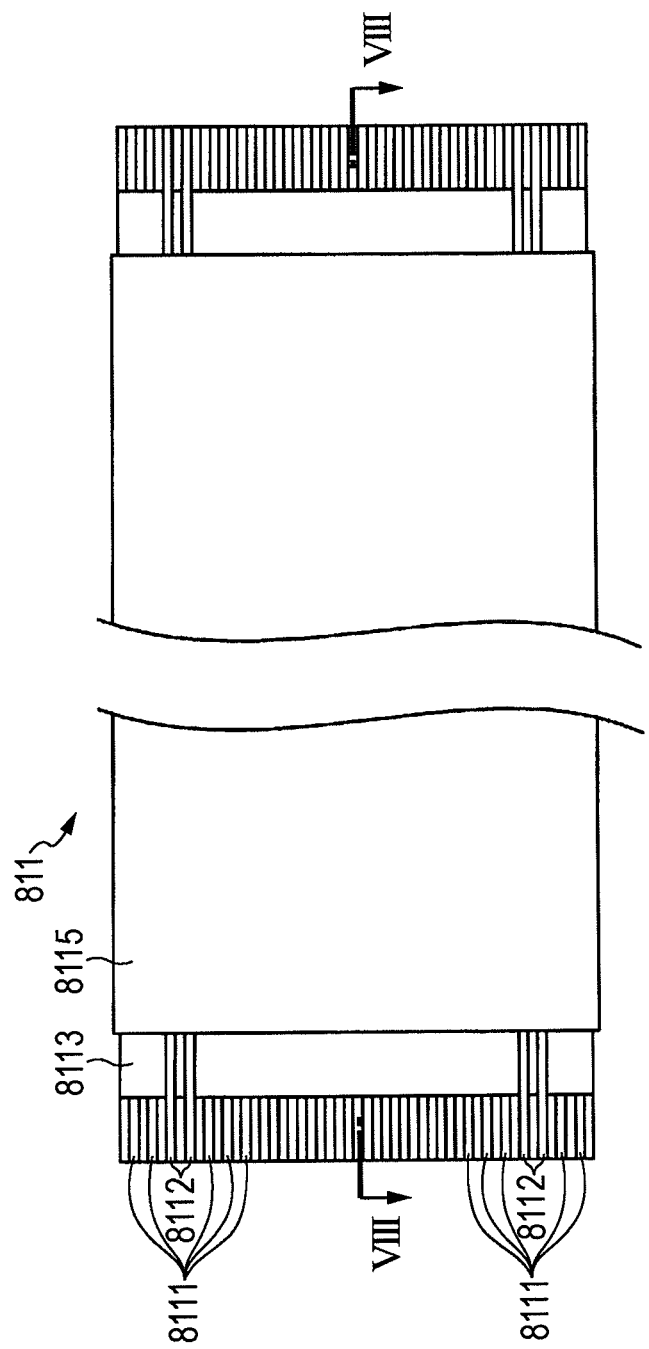
FIG. 7 is an external view of an image-signal cable.

FIG. 7 is an external view of the image-signal cable. Furthermore, FIG. 8 is a cross-sectional view of the image-signal cable illustrated in FIG. 7, which illustrates a cross section taken along a center line.

The image-signal cable 811 is a flexible flat cable (hereinafter, referred to as an "FFC") with a shield. In the image-signal cable 811, fifty core wires 8111 and 8112 constituted by conductors are arranged. The image-signal cable 811 is formed so as to have a sheet shape. The core wires 8111 and 8112 are arranged at a pitch of 0.5 mm. Four core wires 8112 among the fifty core wires 8111 and 8112 are core wires through which the ground potential is transmitted. The four core wires 8112 through which the ground potential is transmitted are arranged so as to be symmetrically positioned with respect to the line VIII-VIII that is a center line of the image-signal cable 811.

Figure 8:
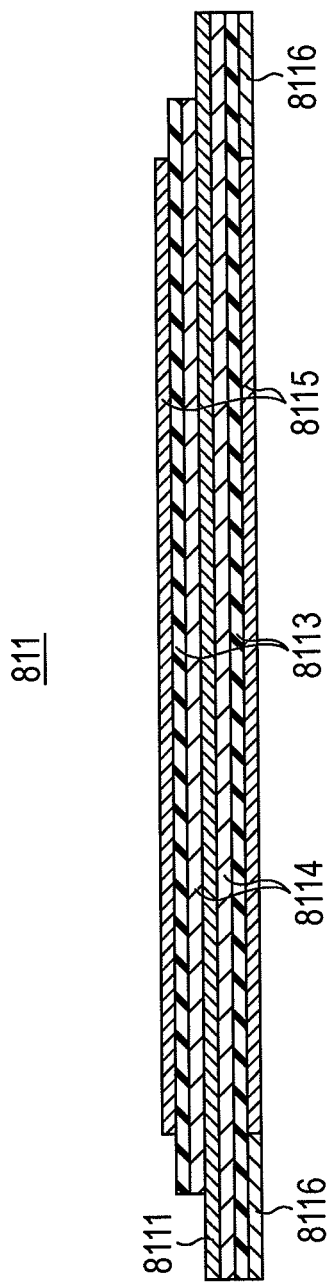
FIG. 8 is a cross-sectional view of the image-signal cable illustrated in FIG. 7, which illustrates a cross section taken along a center line.

As illustrated in FIG. 8, the core wires 8111 (8112) are sandwiched from both sides by insulating layers 8113, which are made of a resin material and which has a sheet shape, via adhesives 8114. Shields 8115 having a sheet shape, each of which is constituted by a conductor, are arranged so as to be more outer than the insulating layers 8113. The shields 8115 cover the core wires 8111 and 8112, thereby reducing radiation of electromagnetic waves that cause noise affecting external signals. The core wires 8111 and 8112 are exposed at both ends of the image-signal cable 811. The exposed portions of the core wires 8111 and 8112 come into contact with terminals 8152 of the image-signal connector 815 (see FIG. 6). Furthermore, reinforcing plates 8116 for reinforcing strength are mounted on the exposed portions of the core wires 8111 and 8112.

Among the fifty core wires 8111 and 8112, four core wires 8112 through which the ground potential is transmitted are connected to the shields 8115. In other words, the four core wires 8112 are grounded via the shields 8115. In the image-signal cable 811 in the present exemplary embodiment, the four core wires 8112 connected to the shields 8115 are arranged so as to be symmetrically positioned with respect to the line VIII-VIII that is the center line C of the image-signal cable 811. Accordingly, even when the image-signal cable 811 is used in an orientation in which the two ends thereof are swapped with each other, i.e., in an orientation in which the image-signal cable 811 is rotated by 180 degrees from a position illustrated in FIG. 7, the positions of the core wires 8112 whose potentials are held so as to be equal via the shields 8115 do not change. Thus, a malfunction or failure caused by confusion of the orientation of the image-signal cable 811 is prevented in a process of assembling the image forming apparatus 1, for example, differently from a case of using a cable having a structure in which the core wires connected to the shields 8115 are asymmetrically arranged with respect to the line VIII-VIII that is the center line C.

Power/Adjustment-Control-Signal Cables

Figure 9:
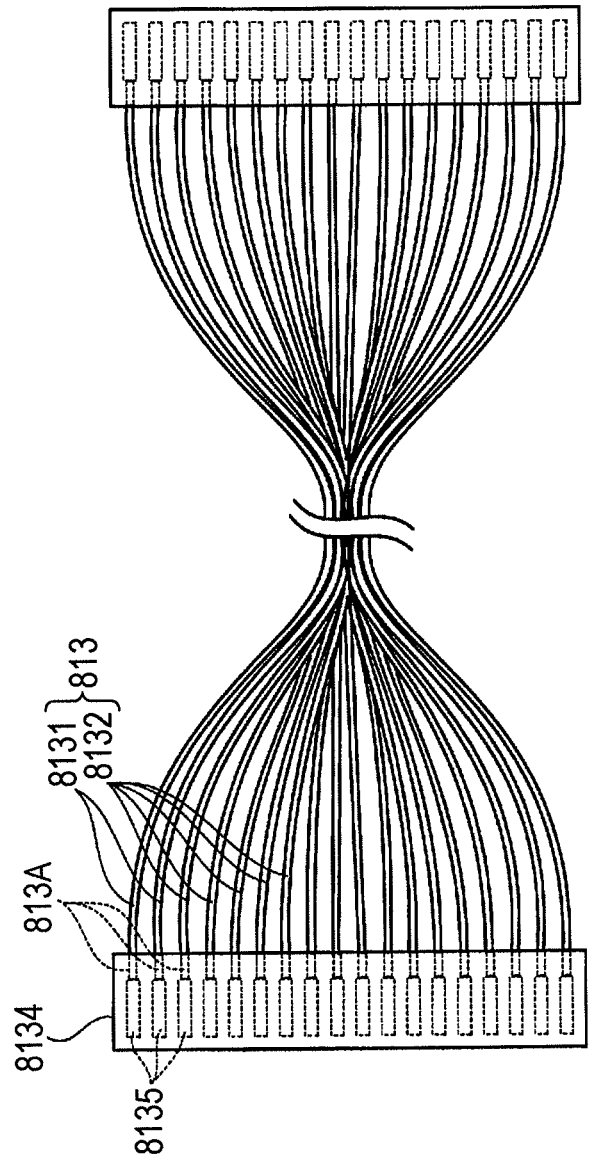
FIG. 9 is an external view of a power/adjustment-control-signal cable.

FIG. 9 is an external view of the power/adjustment-control-signal cables.

The number of power/adjustment-control-signal cables 813 is eighteen. The individual power/adjustment-control-signal cables 813 are solid wires (lead wires) that are separated from one another, and each of the solid wires has a structure in which a core wire 813A constituted by a conductor is covered by a covering. In the power/adjustment-control-signal cables 813, two power cables 8131, through which power is transmitted, and five adjustment-control-signal cables 8132, through which the light-amount adjustment control signals are transmitted, are included.

Ends of each of the power/adjustment-control-signal cables 813 are fixed in shared sockets 8134. More specifically, the core wire 813A is exposed from the covering at both ends of each of the power/adjustment-control-signal cables 813. The core wire 813A is connected to a corresponding one of the eighteen terminals 8135, which are provided in each of the sockets 8134, by swaging or soldering. The eighteen terminals 8135 are arranged side by side in each of the sockets 8134.

Here, referring back to FIG. 6, the image-signal connector 815 and the power/adjustment-control-signal connector 816 will be described.

Structure of Image-Signal Connector

The image-signal connector 815 which the image-signal cable 811 (see FIG. 7) is to be connected to is a connector for an FFC. The image-signal cable 811 includes a connector housing 8151, the terminals 8152, and a latch 8153. The connector housing 8151 is to receive an end of the image-signal cable 811. The terminals 8152 are to be electrically connected to the core wires 8111 and 8112 of the image-signal cable 811. The end of the image-signal cable 811 is fixed by the latch 8153. A recessed portion 815r that is to receive the end of the image-signal cable 811 is formed between the connector housing 8151 and the latch 8153. The fifty terminals 8152 are arranged in the recessed portion 815r. The terminals 8152 are arranged, for example, at a pitch of 0.5 mm. Each of the terminals 8152 extends to the outside of the connector housing 8151, and is connected by soldering to the conductor pattern, which is not illustrated, of the circuit board 81.

When the latch 8153 is operated in a state in which the end of the image-signal cable 811 is inserted between the connector housing 8151 and the latch 8153, the end of the image-signal cable 811 is fixed, so that the fifty core wires 8111 and 8112 of the image-signal cable 811 and the fifty terminals 8152 of the image-signal connector 815 are connected to each other. Accordingly, the image-signal connector 815 relays, to the driving circuit 812, signals that have been transmitted through the image-signal cable 811.

Structure of Power/Adjustment-Control-Signal Cables

The power/adjustment-control-signal connector 816 which the power/adjustment-control-signal cables 813 (see FIG. 9) are to be connected to includes a housing 8161 and terminals 8162. The housing 8161 is to receive one of the sockets 8134 that are provided at the ends of the power/adjustment-control-signal cables 813. The terminals 8162 are to be electrically connected to the core wires 813A of the power/adjustment-control-signal cables 813. In the housing 8161, a recessed portion 816r that is to receive the socket 8134 is formed. In the recessed portion 816r, the eighteen terminals 8162 are provided so as to project from the bottom of the recessed portion 816r. The eighteen terminals 8162 are arranged at a pitch that is substantially wider than the pitch at which the terminals of the image-signal connector 815 are arranged. The eighteen terminals 8162 are arranged, for example, at a pitch of 1.5 mm. Furthermore, each of the terminals 8162 extends to the outside of the housing 8161, and is connected by soldering to the conductor pattern, which is not illustrated, of the circuit board 81.

When the socket 8134 of the power/adjustment-control-signal cables 813 (see FIG. 9) is inserted into the recessed portion 816r of the housing 8161, the core wires 813A of the power/adjustment-control-signal cables 813 and the terminals 8162 of the power/adjustment-control-signal connector 816 are electrically connected to each other via the terminals 8135 of the socket 8134. The power/adjustment-control-signal connector 816 relays, to the driving circuit 812, power and signals which have been transmitted through the power/adjustment-control-signal cables 813.

Regarding the power/adjustment-control-signal connector 816 in the present exemplary embodiment, power terminals 8163, which the core wires 813A of the power cables 8131 (see FIG. 9) are to be connected to, and adjustment-control-signal terminals 8164, which the adjustment-control-signal cables 8132 (see FIG. 9) are to be connected to, are provided in one connector that is the power/adjustment-control-signal connector 816. In other words, the power/adjustment-control-signal connector 816 is one connector that is used as both a power connector 816A, which the power cables 8131 (see FIG. 9) are to be connected to, and an adjustment-control-signal connector 816B, which the adjustment-control-signal cables 8132 (see FIG. 9) are to be connected to. As a structure of a connector, a structure may be employed, in which a power connector and an adjustment-control-signal connector are arranged so as to be separated from each other as different connectors. However, the power/adjustment-control-signal connector 816 in the present exemplary embodiment is one connector that is used as both the power connector 816A and the adjustment-control-signal connector 816B. Accordingly, the number of components is reduced, and the efforts expended to perform tasks of connecting components to each other in an assembling process is reduced, compared with those in a case in which the power connector 816A and the adjustment-control-signal connector 816B are arranged so as to be separated from each other.

A portion, in which the power terminals 8163 are provided, of the power/adjustment-control-signal connector 816 in the present exemplary embodiment corresponds to an example of a power connector in the present invention. A portion in which the adjustment-control-signal terminals 8164 are provided corresponds to an example of an adjustment-control-signal connector in the present invention.

Up to here, the image-signal connector 815 and the power/adjustment-control-signal connector 816 mounted on the circuit board 81 of the exposure device 53 have been described. However, the connectors 215 and 216 mounted on the processing and control circuit 21 illustrated in FIG. 2 have also structures that are similar to the structures of the image-signal connector 815 and the power/adjustment-control-signal connector 816, respectively.

Next, after the driving circuit 812 is described, signals that the power/adjustment-control-signal connector 816 and the image-signal connector 815 relay will be described.

Configuration of Driving Circuit

Figure 10:
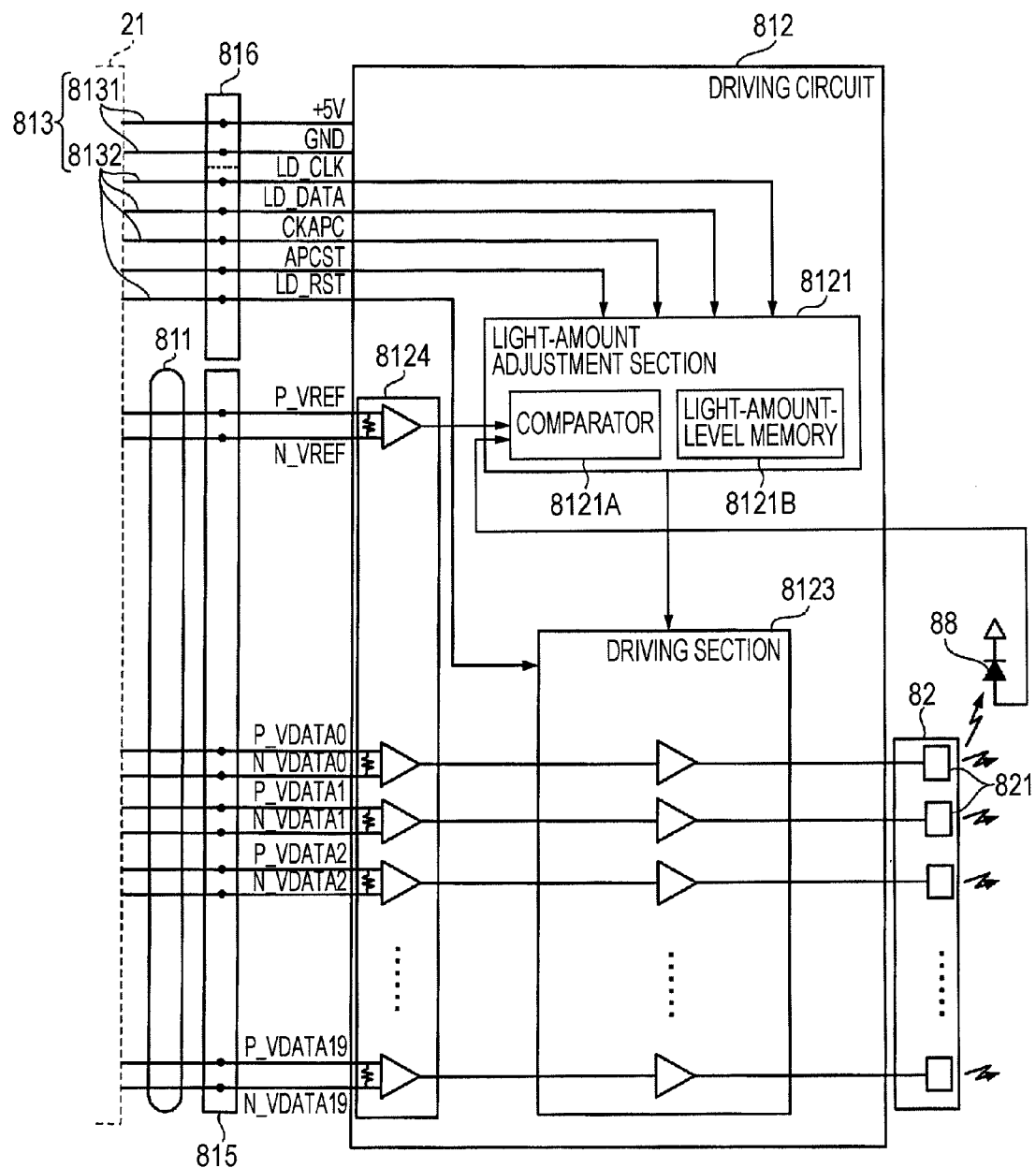
FIG. 10 is a block diagram schematically illustrating a configuration of a driving circuit.

FIG. 10 is a block diagram schematically illustrating a configuration of the driving circuit. In FIG. 10, in addition to the driving circuit 812, the laser diode 82, the optical sensor 88, the processing and control circuit 21, which are connected to the driving circuit 812, the power/adjustment-control-signal cables 813, the image-signal cable 811, the image-signal connector 815, and the power/adjustment-control-signal connector 816 are illustrated.

The driving circuit 812 includes a light-amount adjustment section 8121, a driving section 8123, and a signal converter 8124.

The signal converter 8124 converts the format of signals that have been transmitted through the image-signal cable 811 and the image-signal connector 815. More specifically, the signal converter 8124 converts signals that have been transmitted in a differential signaling format into signals that are to be transmitted in a transistor-transistor logic (TTL) format. The signals transmitted in a differential signaling format are signals based on a low voltage differential signaling (LVDS) standard, e.g., signals having an amplitude of about 350 mv. By transmitting signals in a differential signaling format, an influence of noise, which is exerted from the outside, is reduced, and higher-speed signals are transmitted, for example, compared with a case in which signals are transmitted using single-ended signaling.

The driving section 8123 includes driving elements. Each of the driving elements corresponds to one of the light-emitting elements 821 (see FIG. 5) included in the laser diode 82. The driving section 8123 drives the light-emitting elements 821. The driving section 8123 drives twenty light-emitting elements 821, which are practically used, among the thirty-two light-emitting elements 821 in accordance with the twenty image signals corresponding to the twenty light-emitting elements 821. The twenty image signals are transmitted in a differential signaling format in which differential signals are a P channel signal and an N channel signal. More specifically, forty image signals P_VDATA0 to P_VDATA19 and N_VDATA0 to N_VDATA19 (hereinafter, referred to as "image signals P_VDATA[0:19] and image signals N_VDATA[0:19]) are transmitted in correspondence with the twenty light-emitting elements 821. Furthermore, the driving section 8123 receives a light-emission disable signal LD_RST, thereby forcibly disabling the light-emitting elements 821 from being driven.

The light-amount adjustment section 8121 adjusts the amounts of light emitted from the individual light-emitting elements 821 included in the laser diode 82. The light-amount adjustment section 8121 causes the driving section 8123 to sequentially drive the light-emitting elements 821 in accordance with light-amount adjustment control signals CLKAPC and APCST. The optical sensor 88 receives one portion of light emitted from the individual light-emitting elements 821, and outputs a light-amount signal having a level. The comparator 8121A compares the level of the light-amount signal with a reference level, thereby obtaining a correction level for causing the individual light-emitting elements 821 to output appropriate amounts of light. The reference level is obtained on the basis of pulse-width modulation (PWM) duty ratios of reference-level signals P_VREF and N_VREF. The reference-level signals P_VREF and N_VREF are transmitted in a differential signaling format. A light-amount-level memory 8121B stores the correction level obtained by the comparator 8121A. The sequence of operations performed in the light-amount adjustment section 8121 is set in accordance with operation control signals LD_CLK and LD_DATA.

The driving circuit 812 performs either first drive operation or a second drive operation by switching therebetween. In the first drive operation, the twenty image signals corresponding to the twenty light-emitting elements 821 are supplied from the processing and control circuit 21 (see FIG. 1), and the driving circuit 812 receives the twenty image signals. The driving circuit 812 causes the driving section 8123 to drive each of the twenty light-emitting elements 821 in accordance with a corresponding one of the image signals for use in exposure to light. When the driving circuit 812 receives the supplied light-amount adjustment control signals CLKAPC and APCST, the driving circuit 812 performs the second drive operation. In other words, in accordance with the light-amount adjustment control signals CLKAPC and APCST, the driving circuit 812 causes the light-amount adjustment section 8121 to drive the individual light-emitting elements 821 for use in adjustment of the amounts of light, obtains the correction level, and stores the correction level in the light-amount-level memory 8121B. The light-amount adjustment control signals CLKAPC and APCST are signals for driving the light-emitting elements 821 except when exposure to light is performed. In the above-described first drive operation, the driving section 8123 drives the individual light-emitting elements 821 in accordance with the correction level stored in the light-amount-level memory 8121B. Accordingly, the light-emitting elements 821 emit light so that the amounts of the light are adjusted on the basis of the reference-level signals P_VREF and N_VREF.

As described above, even in a state in which the image signals are not supplied to the driving circuit 812, i.e., even in a state in which the driving circuit 812 does not drive the light-emitting elements for use in exposure to light, the driving circuit 812 receives the supplied light-amount adjustment control signals CLKAPC and APCST, thereby driving the light-emitting elements for use in adjustment of the amounts of light in the second drive operation. Furthermore, the operation control signals LD_CLK and LD_DATA are also used to control of driving the light-emitting elements in the second drive operation.

Here, the light-amount adjustment control signals CLKAPC and APCST, the light-emission disable signal LD_RST, and the operation control signals LD_CLK and LD_DATA correspond to examples of light-amount adjustment control signals in the present invention.

Assignment of Signals to Cables and Connectors

Power generated using a voltage of +5 V and a ground potential GND that are used for operations of the driving circuit 812 and for driving of the light-emitting elements 821 are transmitted through the power cables 8131 among the power/adjustment-control-signal cables 813. Furthermore, the light-amount adjustment control signals CLKAPC and APCST, the light-emission disable signal LD_RST, and the operation control signals LD_CLK and LD_DATA are transmitted through the adjustment-control-signal cables 8132 among the power/adjustment-control-signal cables 813.

The power cables 8131 through which power generated using a voltage of +5 V is transmitted are maintained so as to have a voltage level of 5 V that is a power-supply potential. When the terminals for supply of power are shorted with terminals other than the terminals for supply of power, the processing and control circuit 21 or the driving circuit 812 to which power is supplied may be damaged. Here, the power cables 8131 (see FIG. 9) in the present exemplary embodiment are not FFCs, and are multiple cables that are independent of one another. Moreover, the terminals 8162 (see FIG. 6) of the power/adjustment-control-signal connector 816 are arranged at a pitch which is substantially wider than that of the terminals 8152 of the image-signal connector 815. Accordingly, the occurrence of a short (a ground fault) caused by foreign manner is also reduced, compared with the occurrence of a short caused by foreign manner in the case in which the terminals 8162 of the power/adjustment-control-signal connector 816 are arranged at a narrow pitch such as the pitch of the core wires of the image-signal cable 811 or the pitch of the terminals of the image-signal connector 815. Additionally, even when core wires of an FFC or terminals of a connector are maintained so as to have a voltage level of 5 V, the occurrence of a whisker (a whisker-like metallic crystal) between the terminals is reduced, compared with the occurrence of a whisker between the terminals in the case in which the terminals 8162 of the power/adjustment-control-signal connector 816 are arranged at a narrow pitch. Furthermore, in an assembling process, in the case of connecting the power/adjustment-control-signal cables 813 to the power/adjustment-control-signal connector 816, the occurrence of a short between the terminals when the power/adjustment-control-signal cables 813 in a tilted position are connected to the power/adjustment-control-signal connector 816 is reduced, compared with the occurrence of a short between the terminals in the case in which the terminals 8162 of the power/adjustment-control-signal connector 816 are arranged at a narrow pitch.

Furthermore, the light-amount adjustment control signals CLKAPC and APCST, the light-emission disable signal LD_RST, and the operation control signals LD_CLK and LD_DATA are signals with which the light-emitting elements 821 may be driven except when image formation is performed. When the light-amount adjustment control signals CLKAPC and APCST, the light-emission disable signal LD_RST, or the operation control signals LD_CLK and LD_DATA have unexpected values due to a short associated with terminals or core wires, more particularly, a short that occurs between terminals or core wires and the power supply, the light-emitting elements 821 may be driven except when image formation is performed. In such a case, for example, one portion of the photoconductor 51 whose rotation is stopped may be locally irradiated with light, so that the photoconductor 51 may be damaged.

In the present exemplary embodiment, the adjustment-control-signal cables 8132 (see FIG. 9), through which the light-amount adjustment control signals CLKAPC and APCST, the light-emission disable signal LD_RST, and the operation control signals LD_CLK and LD_DATA are transmitted, are not FFCs, and are multiple cables that are independent of one another. Moreover, the terminals 8162 (see FIG. 6) of the power/adjustment-control-signal connector 816 are arranged at a pitch which is substantially wider than that of the terminals 8152 of the image-signal connector 815. Accordingly, the light-emitting elements 821 are prevented from accidentally emitting light due to a short that occurs between terminals in association with the light-amount adjustment control signals CLKAPC and APCST.

In contrast, regarding the image-signal cable 811 and the image-signal connector 815, the forty image signals P_VDATA[0:19] and N_VDATA[0:19] are transmitted therethrough. The necessary number of image signals corresponds to the number of light-emitting elements 821 that are used. Furthermore, the speed of the image signals representing an image is higher than that of the light-amount adjustment control signals CLKAPC and APCST. Because the image signals are transmitted through a shielded cable, emission of electromagnetic waves to the outside is reduced. The image-signal cable 811 is an FFC. Additionally, regarding the image-signal connector 815, the terminals thereof are arranged at a pitch which is substantially narrower than that of the terminals of the power/adjustment-control-signal connector 816. Accordingly, the size of a connector that is necessary for relaying of signals, the number of signals corresponding to the number of light-emitting elements 821, is smaller than a size of a connector in which terminals are arranged at a wide pitch, such as the pitch at which the terminals of the power/adjustment-control-signal connector 816 are arranged. More specifically, the image-signal connector 815 that relays the forty image signals has a certain size so that the image-signal connector 815 can be arranged on the circuit board 81 which is mounted in a limited space of the exposure device 53. Because the image-signal cable 811 is also an FFC with a shield, the size of a space necessary for arrangement of cables is smaller than that of a space in a case in which multiple shielded lines obtained by individually shielding core wires are used. Accordingly, materials necessary for production of the cable are also reduced.

Furthermore, regarding the reference-level signals P_VREF and N_VREF, because levels are represented by the duty ratios of the reference-level signals P_VREF and N_VREF, the speed of the reference-level signals P_VREF and N_VREF is higher than that of the light-amount adjustment control signals CLKAPC and APCST. In contrast, the reference-level signals P_VREF and N_VREF are additional control signals, and an influence of the reference-level signals P_VREF and N_VREF to emission of light is different from an influence of the light-amount adjustment control signals CLKAPC and APCST to emission of light. Additional control signals are signals that are incapable of exclusively causing the light-emitting elements 821 to emit light. In other words, the reference-level signals P_VREF and N_VREF, which are additional control signals, are signals used to control the amounts of light to be emitted in a case of emission of light with the light-emitting elements 821. However, in a state in which emission of light is stopped by other signals, the reference-level signals P_VREF and N_VREF are incapable of causing the light-emitting elements 821 to emit light. Accordingly, for example, even when the reference-level signals P_VREF and N_VREF have unexpected values due to a short, emission of light in a case in which the light-emitting elements 821 should not emit light does not occur. The reference-level signals P_VREF and N_VREF are relayed by the image-signal connector 815 in which terminals are arranged at a narrow pitch. Thus, the total area occupied by the image-signal connector 815 and the power/adjustment-control-signal connector 816 is reduced. Additionally, because the reference-level signals P_VREF and N_VREF are transmitted through the image-signal cable 811, emission of electromagnetic waves to the outside is reduced.

Note that, in the above-described exemplary embodiment, as an example of a power connector and an adjustment-control-signal connector in the present invention, a configuration in which the power/adjustment-control-signal connector 816 is used as both a power connector and an adjustment-control-signal connector is provided. However, the present invention is not limited thereto. For example, a power connector and an adjustment-control-signal connector may be disposed so as to be separated from each other as different connectors.

Furthermore, in the above-described exemplary embodiment, the power/adjustment-control-signal connector 816, in which eighteen terminals are arranged at a pitch of 1.5 mm, is provided as an example of a power/adjustment-control-signal connector that is used as both a power connector and an adjustment-control-signal connector in the present invention. However, the present invention is not limited thereto. For example, the power/adjustment-control-signal connector in the present invention may be a power/adjustment-control-signal connector having seventeen or less terminals or a power/adjustment-control-signal connector having nineteen or more terminals. Furthermore, the pitch at which terminals of the power/adjustment-control-signal connector in the present invention are arranged may be any pitch that is substantially wider than the pitch at which the terminals of the image-signal connector are arranged, i.e., a pitch other than 1.5 mm, such as 1 mm or 2 mm.

Moreover, in the above-described exemplary embodiment, the image-signal cable 811 having fifty core wires and the image-signal connector 815 having fifty terminals are provided as an example of an image-signal cable and an example of an image-signal connector, respectively. However, the present invention is not limited thereto. The image-signal cable in the present invention may be an image-signal cable having fifty-one or more core wires or an image-signal cable forty-nine or less core wires. The image-signal connector may be an image-signal connector having fifty-one or more terminals or an image-signal connector having forty-nine or less terminals. Additionally, a pitch at which the core wires or the terminals are arranged is also not limited to 0.5 mm.

Furthermore, in the above-described exemplary embodiment, the light-amount adjustment control signals CLKAPC and APCST, the light-emission disable signal LD_RST, and the operation control signals LD_CLK and LD_DATA are provided as examples of light-amount adjustment control signals in the present invention. However, the present invention is not limited thereto. The light-amount adjustment control signals in the present invention may be, for example, some of the light-amount adjustment control signals CLKAPC and APCST, the light-emission disable signal LD_RST, and the operation control signals LD_CLK and LD_DATA.

Moreover, in the above-described exemplary embodiment, the image forming apparatus 1 having the six developing units 61_1 to 61_6 and the one photoconductor 51 is provided as an example of an image forming apparatus according to the present invention. However, the image forming apparatus according to the present invention is not limited thereto. For example, the image forming apparatus according to the present invention may be a so-called tandem apparatus. Furthermore, the image forming apparatus according to the present invention may be an apparatus dedicated to monochrome images.

Additionally, in the above-described exemplary embodiment, the image forming apparatus 1 having the document reading section 10 is provided as an example of the image forming apparatus according to the present invention. However, the image forming apparatus according to the present invention may be, for example, a printer or a facsimile.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An exposure device comprising:
    a plurality of light emitting elements that emit light which an exposure target member is exposed to;
    a driving circuit that performs at least one of a first drive operation and a second drive operation, the first drive operation being an operation of receiving a plurality of image signals, which have been supplied, corresponding to the plurality of light emitting elements and of individually driving, for use in exposure to light, the plurality of light emitting elements in accordance with the plurality of image signals, the second drive operation being an operation of receiving supplied light-amount adjustment control signals used to control amounts of light and of individually driving, for use in adjustment of the amounts of light, the plurality of light emitting elements in accordance with the light-amount adjustment control signals;
    an image-signal connector that has a plurality of terminals connected to a plurality of core wires of an image-signal cable, and that relays, to the driving circuit, the plurality of image signals which have been transmitted through the image-signal cable, the image-signal cable being a cable in which the plurality of core wires through which the plurality of image signals are transmitted are arranged at a first pitch and which is formed so as to have a sheet shape;
    a power connector that has a plurality of terminals which are arranged at a pitch substantially wider than the first pitch, and that relays, to the driving circuit, power which has been transmitted through a plurality of power cables, each of the plurality of terminals of the power connector being connected to a corresponding one of core wires of the plurality of power cables through which power is transmitted; and
    an adjustment-control-signal connector that has a plurality of terminals which are arranged at a pitch substantially wider than the first pitch, and that relays, to the driving circuit, the light-amount adjustment control signals which have been transmitted through a plurality of adjustment-control-signal cables, each of the plurality of terminals of the adjustment-control-signal connector being connected to a corresponding one of core wires of the plurality of adjustment-control-signal cables through which the light-amount adjustment control signals are transmitted.

2. The exposure device according to claim 1, wherein, instead of both the power connector and the adjustment-control-signal connector, the exposure device includes a power/adjustment-control-signal connector that has a plurality of terminals, and that relays both power, which has been transmitted through the plurality of power cables, and the light-amount adjustment control signals, which have been transmitted through the plurality of adjustment-control-signal cables, to the driving circuit, each of the plurality of terminals of the power/adjustment-control-signal connector being connected to a corresponding one of the core wires of the plurality of power cables or a corresponding one of the core wires of the plurality of adjustment-control-signal cables.

3. The exposure device according to claim 1,
    wherein, in addition to the plurality of core wires through which the plurality of image signals are transmitted, the image-signal cable further includes a core wire through which an additional control signal is transmitted, the additional control signal being different from each of the light-amount adjustment control signals and being used to control an operation of the driving circuit, and
    wherein the image-signal connector relays both the plurality of image signals and the additional control signal, which have been transmitted through the image-signal cable, to the drive circuit.

4. The exposure device according to claim 2,
    wherein, in addition to the plurality of core wires through which the plurality of image signals are transmitted, the image-signal cable further includes a core wire through which an additional control signal is transmitted, the additional control signal being different from each of the light-amount adjustment control signals and being used to control an operation of the driving circuit, and wherein the image-signal connector relays both the plurality of image signals and the additional control signal, which have been transmitted through the image-signal cable, to the drive circuit.

5. An image forming apparatus comprising:

a photoconductor on which a latent image is to be formed by exposure to light; and an exposure device that exposes the photoconductor to light, the exposure device including a plurality of light emitting elements that emit light which an exposure target member is exposed to, a driving circuit that performs at least one of a first drive operation and a second drive operation, the first drive operation being an operation of receiving a plurality of image signals, which have been supplied, corresponding to the plurality of light emitting elements and of individually driving, for use in exposure to light, the plurality of light emitting elements in accordance with the plurality of image signals, the second drive operation being an operation of receiving supplied light-amount adjustment control signals used to control amounts of light and of individually driving, for use in adjustment of the amounts of light, the plurality of light emitting elements in accordance with the light-amount adjustment control signals, an image-signal cable in which a plurality of core wires through which the plurality of image signals are transmitted are arranged at a first pitch and which is formed so as to have a sheet shape, an image-signal connector that has a plurality of terminals connected to the plurality of core wires of the image-signal cable, and that relays the plurality of image signals, which have been transmitted through the image-signal cable, to the driving circuit, a plurality of power cables through which power is transmitted, a power connector that has a plurality of terminals which are arranged at a pitch substantially wider than the first pitch, and that relays power, which has been transmitted through the plurality of power cables, to the driving circuit, each of the plurality of terminals of the power connector being connected to a corresponding one of core wires of the plurality of power cables, a plurality of adjustment-control-signal cables through which the light-amount adjustment control signals are transmitted, and an adjustment-control-signal connector that has a plurality of terminals which are arranged at a pitch substantially wider than the first pitch, and that relays the light-amount adjustment control signals, which have been transmitted through the plurality of adjustment-control-signal cables, to the driving circuit, each of the plurality of terminals of the adjustment-control-signal connector being connected to a corresponding one of core wires of the plurality of adjustment-control-signal cables.

* * * * *